July 8, 1958 A. BETTI 2,842,027
STEREOSCOPIC DEVICE IN THE FORM OF A BOOK
Filed May 23, 1956
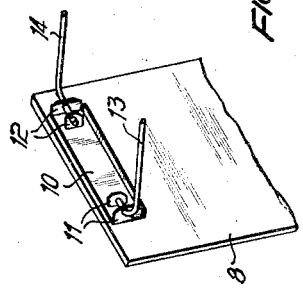
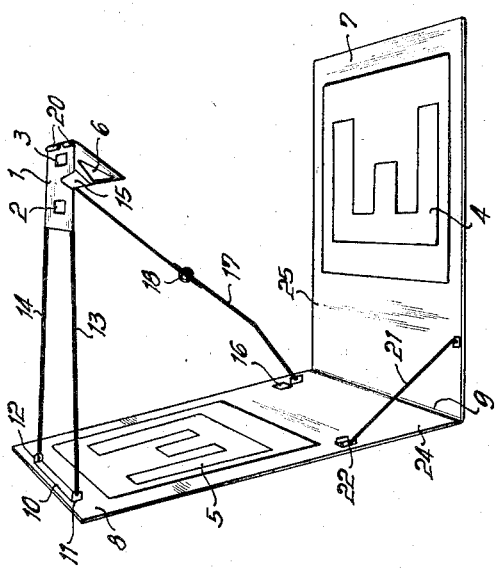
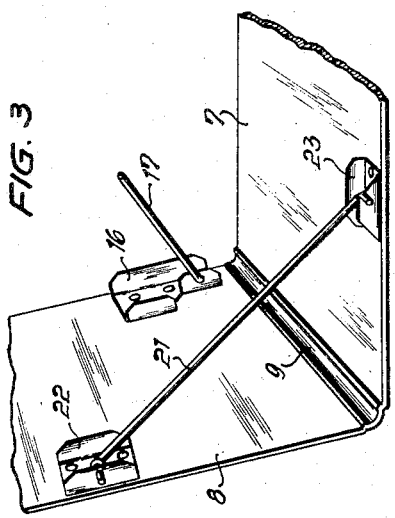
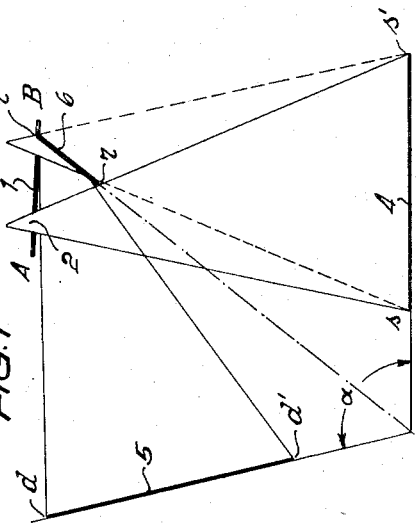
INVENTOR
ADRIANO BETTI,
BY:— Chatwin & Company.
ATTORNEYS

United States Patent Office 2,842,027
Patented July 8, 1958

2,842,027

STEREOSCOPIC DEVICE IN THE FORM OF A BOOK

Adriano Betti, Lucca, Italy

Application May 23, 1956, Serial No. 586,865

2 Claims. (Cl. 88—30)

It is known that seeing two flat views of the same subject, taken from two different points of view and each looked at with only one eye, gives the sensation of relief, that is the different parts of what we see give us the impression of a single image, the various points of which seem to be placed at different distances as if they were not in the same plane, almost as if the real subject were being observed. In other words, the right eye sees only the right-hand view, the left eye only the left-hand view, which is an essential condition for the perception of relief, and the merging of the two views is facilitated because a convergence and an accommodation are imposed on the eyes which are identical with those which would be obtained on seeing the real subject.

The present invention has for its object a stereoscopic device in the form of a book constituted essentially by a folder containing a plurality of sheets or leaves, the adjacent pages of which, when the folder is open, each carry an image, one of which images is the left-hand stereoscopic image and the other a reversed view of the right-hand stereoscopic image, the folder being kept open at a specific angle on the bisector of which there is a mirror reflecting the reversed image and hinged to a mask provided with a pair of apertures for the eyes and made to project above or overhang the real image by means of a suitable support, which real image is observed by the left eye, while the right eye sees the reversed image reflected by the mirror and which is therefore virtual.

Other details and advantages of the invention will appear in the course of the following description, which, being referred to the accompanying drawing given by way of example, will make it clearly understood how the present invention may be carried into effect, the details deriving both from the text and from the accompanying drawing forming, of course, part of said invention.

Fig. 1 is a diagrammatic section of the device.

Fig. 2 is a perspective view of the device with the folder open and ready for use.

Figs. 3 and 4 show details in perspective view on an enlarged scale.

Referring to Figure 1, the segment A—B is the section of the mask 1, which is provided with the apertures 2, 3 for the left and right eye, respectively. The two stereoscopic images 4, 5 are located in a horizontal plane the section of which is indicated by $s—s'$, while the other is located in a plane forming an angle with the first plane, the section of which is indicated by $d—d'$. The segment $r—r'$ is the section of a mirror 6, the reflecting surface of which is located on the bisector of the angle. The stereoscopic image 4 is the one seen by the left eye, while the stereoscopic image 5 is that seen by the right eye, but is printed reversed.

Referring to the device proper, shown in perspective view in Fig. 2, 7 and 8 designate the two parts forming the folder, which is folded in the form of a book at 9, forming the apex of the angle. At the end of the left-hand part 8 of the folder there is fixed a small support formed by a strip or small plate 10 having lateral lugs 11, 12 formed by punching in which are pivoted the bent ends of two thin metal rods 13, 14, the opposite ends of which carry the mask 1 in which is formed a notch 15 for accommodating the nose. To a second support 16, which is smaller but similar and is fixed at the bottom, there is attached the bent end of a stay rod 17, hinged at 18, which is designed to keep the mask 1 at the proper distance from the image and the mirror 6, with its support 19 pivoted at 20 to said mask, in the correct angular position. A third stay rod 21 with bent ends, one of which is attached to the small support 22, while the other is automatically engaged in the small support 23 every time the folder is opened, serves to keep the folder open at the angle.

The folder 7, 8 is provided with sheets or leaves, so that when it is open the right-hand page carries the image 4 seen by the left eye, while the left-hand page carries the image 5 seen by the right eye, but which is reversed and is rectified by means of the mirror 6.

It is obvious that inner spaces 24, 25 can be devoted to text explaining the image.

The viewer placing his right eye at 3 (Fig. 1) sees the virtual image $d—d'$ rectified by the mirror and superimposed on the image $s—s'$, which is the real image seen by the left eye. The optical conditions for perfect three-dimensional vision are thus satisfied.

I claim:

1. A stereoscopic viewing device comprising two covers hinged together at their adjacent side edges to form a folder, a plurality of leaves pivotably secured at the hinge point of the folder to permit turning over in the manner of leaves of a book when the folder is in opened position, the facing surfaces of each adjacent pair of leaves bearing respectively left-hand and right-hand stereoscopic images of a subject and one of said images being formed in mirror-image reversed manner, lug means mounted adjacent the other side edge of one of the leaves, a support pivotably engaged on said lug means for movement about an axis parallel to the hinge of the cover, a double-aperture eye-piece carried on the support, a collapsible stay pivotably coupled at one end to said leaf adjacent the hinge and at the other end to the eye-piece to hold said eye-piece in a predetermined erected position with respect to the cover, and a mirror mounted on the stay adjacent the eye-piece, one aperture of the eye-piece in the erected position thereof permitting viewing of the mirror-image reversed subject image in the mirror and the other aperture permitting direct vision of the other subject image.

2. In a stereoscopic viewing device, as claimed in claim 1, a bracket on one of the covers, a catch member on the other cover, and a tie member pivotably mounted on the bracket and engageable with the catch member to retain the covers in a predetermined position of opening.

References Cited in the file of this patent

UNITED STATES PATENTS 871,974     Verbeck _____ Nov. 26, 1907

FOREIGN PATENTS 451,709     Italy _____ Sept. 26, 1949